United States Patent
Lundberg

(10) Patent No.: US 10,988,325 B2
(45) Date of Patent: Apr. 27, 2021

(54) BRAKE DEVICE FOR A CONVEYOR SYSTEM

(71) Applicant: FlexLink AB, Gothenburg (SE)

(72) Inventor: Hakon Lundberg, Sävedalen (SE)

(73) Assignee: FlexLink AB, Gothenburg (SE)

( * ) Notice: Subject to any disclaimer, the term of this patent is extended or adjusted under 35 U.S.C. 154(b) by 0 days.

(21) Appl. No.: 16/647,044

(22) PCT Filed: Sep. 11, 2018

(86) PCT No.: PCT/SE2018/050912
§ 371 (c)(1),
(2) Date: Mar. 13, 2020

(87) PCT Pub. No.: WO2019/054920
PCT Pub. Date: Mar. 21, 2019

(65) Prior Publication Data
US 2020/0255227 A1    Aug. 13, 2020

(30) Foreign Application Priority Data
Sep. 13, 2017 (SE) .................... 1751111-4

(51) Int. Cl.
*B65G 47/88* (2006.01)
*B65G 47/26* (2006.01)

(52) U.S. Cl.
CPC .... *B65G 47/266* (2013.01); *B65G 2201/0267* (2013.01); *B65G 2205/06* (2013.01); *B65G 2207/28* (2013.01)

(58) Field of Classification Search
CPC ...... B65G 47/26; B65G 47/266; B65G 47/88; B65G 13/075

USPC .......................... 198/459.6; 193/35 A, 35 G
See application file for complete search history.

(56) References Cited

U.S. PATENT DOCUMENTS

| | | | | |
|---|---|---|---|---|
| 2,565,001 A | * | 8/1951 | Schutt | B28B 13/04 193/35 R |
| 3,891,073 A | * | 6/1975 | Coleman | B65G 1/08 193/35 A |
| 4,136,763 A | * | 1/1979 | Pryor | B65G 47/8823 144/248.5 |
| 4,236,865 A | * | 12/1980 | Ullman | B65G 1/08 193/35 A |
| 4,334,607 A | * | 6/1982 | Dyer | B65G 47/52 198/468.1 |
| 4,541,521 A | * | 9/1985 | Menge | B65G 1/06 198/463.5 |

(Continued)

*Primary Examiner* — Douglas A Hess
(74) *Attorney, Agent, or Firm* — Sage Patent Group

(57) ABSTRACT

A brake device for a conveyor system where pallets are conveyed on a transport plane, comprising a body having a first section and a second section, where the first section is provided with a pivot element comprising an inclined landing zone with a second nose, and where the second section comprises an inclined contact surface with a first nose, where the brake device is pivotably suspended on an axle, where the brake device is adapted to hold a first position in which the first nose extends over the transport plane, where the brake device is adapted to hold a second position in which the second nose extends over the transport plane, and where the brake device comprises a damper element arranged between the pivot element and the first section of the body of the brake device.

12 Claims, 4 Drawing Sheets

(56) References Cited

U.S. PATENT DOCUMENTS

| | | | | |
|---|---|---|---|---|
| 5,224,828 | A * | 7/1993 | Lawless | B65G 13/075 |
| | | | | 193/35 A |
| 5,806,661 | A * | 9/1998 | Martin | B65G 47/261 |
| | | | | 198/781.05 |
| 5,860,505 | A * | 1/1999 | Metzger | B65G 47/8823 |
| | | | | 198/345.1 |
| 6,189,672 | B1 * | 2/2001 | Schut | B65G 1/08 |
| | | | | 193/35 A |
| 6,213,285 | B1 * | 4/2001 | Smith | B65G 47/32 |
| | | | | 198/345.3 |
| 6,220,418 | B1 * | 4/2001 | Moradians | B65G 13/075 |
| | | | | 193/35 A |
| 6,439,369 | B1 * | 8/2002 | Brown | B65G 47/647 |
| | | | | 193/35 G |
| 6,523,671 | B2 * | 2/2003 | McTaggart | B65G 47/266 |
| | | | | 198/345.1 |
| 7,111,721 | B1 * | 9/2006 | Turner | B65G 47/8823 |
| | | | | 193/35 A |
| 7,249,666 | B1 * | 7/2007 | Robinson | B65G 47/8823 |
| | | | | 193/35 A |
| 7,380,649 | B2 * | 6/2008 | Lauyans | B65G 47/8823 |
| | | | | 193/35 A |
| 7,419,045 | B2 * | 9/2008 | Kelsch | B65G 47/53 |
| | | | | 198/459.6 |
| 7,513,355 | B2 * | 4/2009 | Unterhuber | B65G 47/8823 |
| | | | | 193/35 A |
| 7,938,246 | B2 * | 5/2011 | Lindemann | B65G 47/8823 |
| | | | | 198/345.3 |
| 8,770,383 | B2 * | 7/2014 | Matsumoto | B65G 47/29 |
| | | | | 198/459.6 |
| 9,090,407 | B2 * | 7/2015 | Matsumoto | B65G 43/00 |
| 2020/0339364 | A1 * | 10/2020 | Eckerstrom et al. | |

* cited by examiner

BRAKE DEVICE FOR A CONVEYOR SYSTEM

CROSS-REFERENCE TO RELATED APPLICATIONS

This application is a 35 U.S.C. § 371 national stage application of PCT International Application No. PCT/SE2018/050912 filed on Sep. 11, 2018, which in turn claims priority to Swedish Patent Application No. 1751111-4 filed on Sep. 13, 2017, the disclosures and content of which are incorporated by reference herein in their entirety.

TECHNICAL FIELD

The present invention relates to a brake device for a conveyor system.

BACKGROUND ART

Conveying devices, such as those which are used for moving objects between different stations in a factory, usually comprise a conveying track in the form of a belt or a chain. The conveying tracks can be recessed in a trench with vertical side surfaces. Alternatively, they can be located on the horizontal upper surfaces of the trench or arranged in some other way. The objects to be conveyed are arranged slidably in relation to the conveying tracks, either directly or via carrying means, which are also known as pallets. A specific type of pallet is a puck, which is a round carrier adapted for smaller and more lightweight objects.

A pallet is conveyed along the conveying device, which comprises different workstations. At a workstation, the pallet will be stopped by a stop member such that the operation may be performed on the transported object. In some cases, the object may pass a specific workstation without an operation being performed on the object. The stop member may for this reason be arranged to either stop the pallet or to let the pallet pass the workstation.

If the conveying device is of a conventional type, in which all workstations are positioned after each other and the operations on the objects are performed synchronous, every pallet will stop at each workstation. If no operation is to be performed on an object at a specific workstation, the object will have to wait until the operation on the previous object at that workstation is ready, until the object can continue. All pallets are in this case released at the same time and moves at the same time. One advantage of such a system is that it is easy to predict the performance of the system. One disadvantage of such a system is that it is not very flexible. If the operation time at a work station is long, all objects will have to wait that time, even if there is no operation performed on all objects. Thus, such systems are mostly used for a single product or when the differences in the products are small.

In other systems, the operations on the objects are performed asynchronous, i.e. the pallet stops at a workstation where an operation is to be performed, and is released when the operation is ready. In such systems, a queue comprising a number of pallets may thus be required at at least a few of the workstations in order to compensate for the different through-flow times of the products and for the different operation times at a workstation.

In a normal pallet or puck queue, the pallets or pucks are allowed to bump into each other when they reach the end of the queue. A pallet or puck may be provided with a damper or resilient member in order to minimize the forces acting on the pallet or puck when they are stopped. This technology is used on pallets or pucks that convey somewhat heavier objects. For light objects, no additional damping is required.

For pallets conveying heavy objects, from 10 kg up to over 100 kg and more, damping means integrated in the pallet may not be enough. A further problem is that the stop member holding the first pallet in a pallet train will be subjected to the impact force of every pallet in the pallet train. It is thus common to use a stop member for every single pallet in the pallet train, such that the forces from one pallet will not affect the other pallets. Such a solution is relatively costly and inflexible, since several active stop members are required. It is further required to set up the conveyor system for the exact amount of pallets in a pallet train when the conveyor system is designed, since each stop member has to be controlled by the control system of the conveyor system. A change in the number of pallets in a pallet train will thus be difficult to implement.

U.S. Pat. No. 2,565,001 discloses a brake arrangement for a concrete block moulding machine, in which the brake arrangement will be able to brake a second pallet with concrete blocks if a first pallet with concrete blocks bears on a front part of the brake arrangement. The shown brake arrangement is fixedly installed in the runway, which comprises a plurality of rollers. When a first pallet bears on a first shoe of the brake arrangement, a second shoe will protrude over the runway, where the second shoe will stop the second pallet before it hits the first pallet.

U.S. Pat. No. 4,236,865 describes a system wherein pallets and their loads are conveyed along paths to one or more unloading stations. A brake assembly, applies a braking force to the underside of an arriving upstream pallet at an upstream position so as to decelerate it gradually and safely to a stop at a distance from the unloading station pallet. The system is fixedly arranged in a pallet flow system.

These systems may work acceptable in some cases. There is however a need for a more flexible solution. There is thus room for improvements.

DISCLOSURE OF INVENTION

An object of the invention is therefore to provide an inventive brake device for a conveyor system. Another object of the invention is to provide a conveyor system comprising at least one brake device.

The solution to the problem according to the invention is described in the characterizing part of claim 1. Claim 11 contains an advantageous conveyor system. The other claims contain advantageous embodiments and further developments of the brake device and the conveyor system.

In a brake device for a conveyor system where pallets are conveyed on a transport plane, comprising a body having a first section and a second section, a pivot element having a first end and a second end, where the pivot element comprises an inclined landing zone with a second nose, where the second section comprises an inclined contact surface with a first nose, where the brake device comprises a hole adapted to pivotably suspend the brake device on an axle, where the brake device is adapted to hold a first position in which the first nose extends over the transport plane, where the brake device is adapted to hold a second position in which the second nose extends over the transport plane, the object of the invention is achieved in that the first end of the pivot element is pivotably attached to the first section of the body and that the brake device comprises a damper element arranged between the second end of the pivot element and the first section of the body of the brake device.

By this first embodiment of the brake device according to the invention, a passive brake device that can brake a pallet to a low speed is provided. With such a brake device, the brake device can lower the speed of a pallet and thus the impact force from the pallet, which allows a pallet train to use only a single stop member. This is especially advantageous for heavy pallets conveying heavy objects. A further advantage is that the brake device does not require an active control signal. Additional brake devices can thus be added to the conveyor system without the need to reprogram the control system. The brake device is attached to a conveyor beam and does not require any additional brackets or the like. In this way, it is easy to add or move brake devices according to changing requirements. Brake devices that are not needed may also be removed in an easy way.

The brake device is provided with a first position and a second position. In the first position, the brake device will be deactivated and will not brake a pallet that arrives at the brake device. The pallet can pass the brake device without any braking action applied to the brake device. If the pallet is stopped with a stop member, the rear support of the pallet will bear on a forward nose of the brake device, such that the brake device is in a second position, where it is adapted to brake a subsequent pallet. When a subsequent pallet arrives, a forward support of the pallet will hit a landing zone of a pivot element of the brake device. The pallet support will glide on the inclined landing zone and will push it downwards. The brake device is provided with a damper means between the pivot means and the body of the brake device. When the pallet bears on the pivot element, the damper will slowly deflate and at the same time, the speed of the pallet will be reduced. When the damper element is completely deflated, the pallet will be able to continue forwards towards the pallet in front, but with a significantly reduced speed. The impact on the stop member by the subsequent pallet will thus be minimized.

The damper element is adapted to the weight of the pallet with a conveyed object. If different objects are conveyed, the damper is adapted to the heaviest combination of a pallet and an object. Since the damper does not comprise a spring action, and is solely intended to reduce the speed of a pallet, the time for the damper to deflate will depend on the weight of the combination of a pallet and a conveyed object. By adapting the damper to the heaviest combination, it is ensured that the damper will always be able to reduce the speed of a pallet. With an empty pallet, the deflate time will be somewhat longer, but the speed of the pallet will still be reduced.

When several brake devices are to be used for a longer pallet train, a brake device is arranged at each stop position of a pallet. The distance between two brake devices will thus correspond to the length of a pallet. An optional number of brake devices may be used, in dependency of the longest anticipated pallet train. A brake device is easily mounted to the conveyor at the desired position.

The brake device is preferably arranged in the first position when it is idle. The brake device is preferably designed such that it will hold the first position by itself. The brake device is arranged pivotable on an axle having a rotational axis. The weight of the first section of the body of the brake device, the pivot element and the damper is in this example heavier than the second section of the body of the brake device. In this way, the brake device will tilt towards the first section, and will preferably rest at a position member that defines the first position. It is also possible to use a resilient element such as a coil spring to position the brake device in the first idle position.

The brake device is arranged on an axle mounted either between the right side and the left side of the conveyor, or to one of the conveyor beams. The brake device is mainly intended for heavy duty conveyors comprising accumulation chains as conveying means. In such conveyors, an accumulation chain is arranged on each side of the conveyor. The accumulation chains are moved forwards on the conveyor beams, and the pallet bears on the transport rollers of the accumulation chain and is in this manner conveyed forwards by the transport rollers. This type of conveyor is thus adapted for heavy loads of up to 100 kg and more. The brake device is arranged at a predefined sideway position on the axle, in a position where a pallet support will be able to interact with the brake device. Normally, the pallet support does not extend around the complete pallet, but is arranged at the corner regions of the pallet, often in an asymmetric manner.

The pivot element is preferably mounted to the body of the brake device in a removable manner, such that the pivot element can be replaced if it is worn. Another advantage of a removable pivot element is that the damper can be easily replaced when the pivot element is removed. In this way, different damper elements can be used, depending on the weight of the pallet and the conveyed object. It is thus easy to adapt a brake device for different objects if required.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims. References such as longitudinal, horizontal, vertical, right, left etc. refer to directions of a conveyor in normal use.

Figure 1:
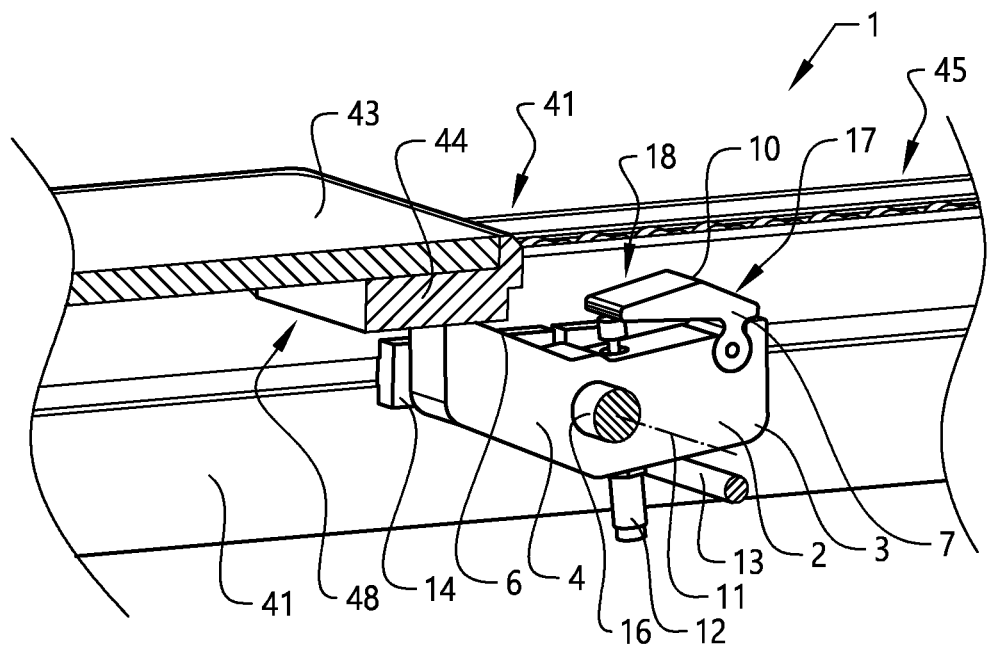
FIG. 1 shows a brake device according to the invention arranged on a conveyor beam.
Figure 7:
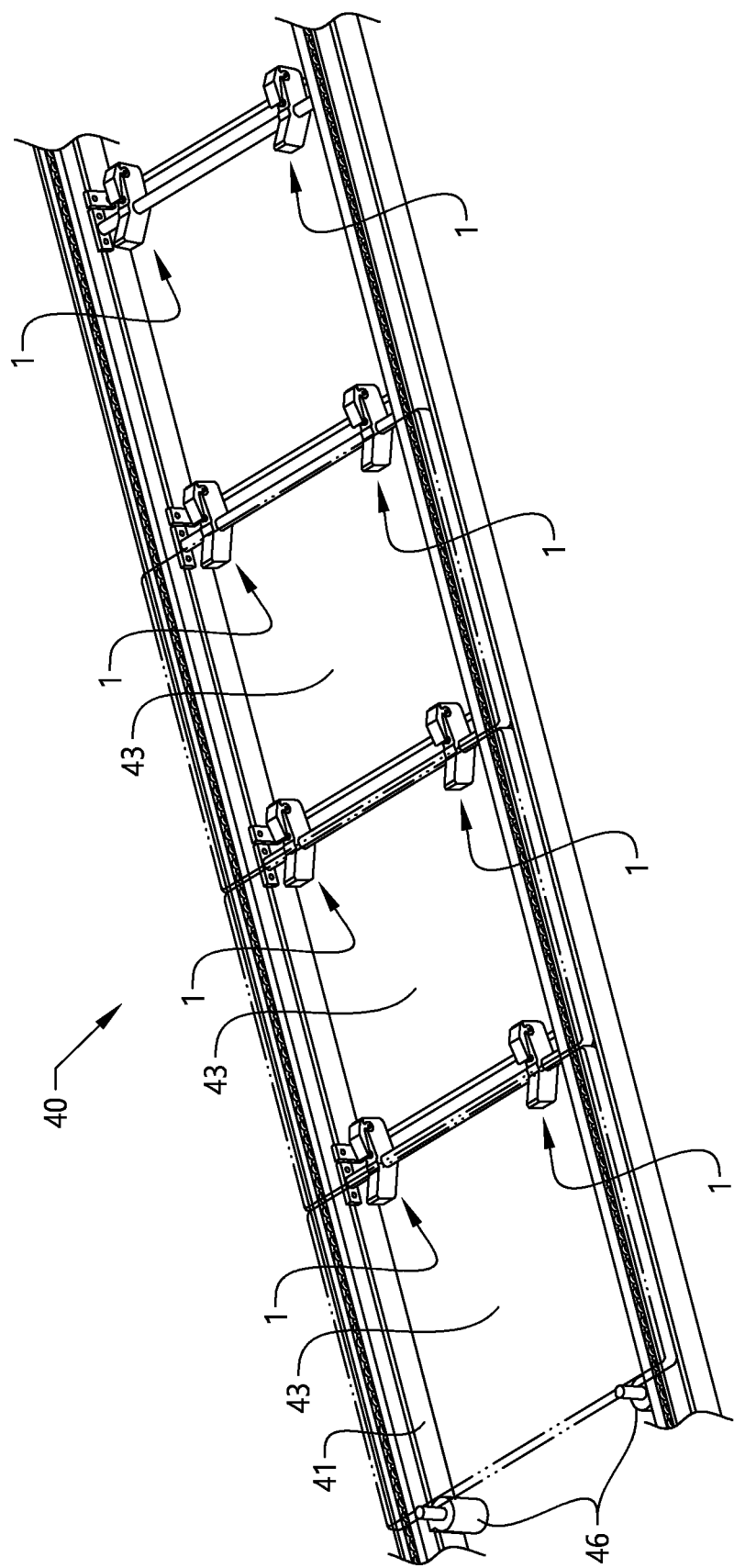
FIG. 7 shows a conveyor system comprising a plurality of brake devices according to the invention.

FIG. 1 shows a view of a conveyor 41 with a brake device 1 according to the invention, FIGS. 2 to 6 show details of a brake device, and FIG. 7 shows a conveyor system comprising a plurality of brake devices. The brake device is primarily intended to be used in conveyor systems adapted for heavy objects, where a loaded pallet may weigh up to 100 kg and more, and where the pallet is conveyed by the use of accumulation chains, and where the conveyor system comprises two conveyor beams arranged at each side of the conveyor, each comprising an accumulation chain.

The brake device 1 comprises a body 2 having a first section 3 and a second section 4. The first section 3 is the part of the body located to the right of the rotational axis 11 as seen in FIG. 1, and the second section is the part located to the left of the rotational axis 11. The second section 4 comprises an inclined contact surface 5 with a first nose 9. The inclined contact surface is provided with a contact point 6, which is the position on the contact surface where a pallet support will hit the contact surface when the brake device is in a first position 20. The body comprises a hole 15 by which the brake device is mounted on an axle 16. The hole 15 is preferably arranged in the central portion of the body 2 and delimits the first section 3 from the second section 4. The brake device can pivot on the axle, around a rotational axis 11. The brake device is in this example mounted to a conveyor beam by a mounting member 14 to which the axle 16 is fixedly attached. The mounting member is preferably mounted to a channel of the conveyor beam by the use of T-nuts and screws. In this way, it is easy to position the brake device in a desired longitudinal position. The brake device is attached to the axle 16 in a pivotable manner and in a sideways fixed position. Preferably, the brake device will be positioned relatively close to one of the conveyor beams. One reason for this is that the pallet support that will interact with the brake device does not extend around the complete pallet. It is also possible to mount the brake device to an axle extending between the two conveyor beams. In a conveyor system, one brake device 1 is mounted at each side of the conveyor, close to each conveyor beam. The brake device 1 may e.g. be fixed sideways by the use of a clamp ring or the like.

The brake device 1 further comprises a pivot element 7 that is pivotable attached to the body 2. In the shown example, the pivot element is provided with a semi-circular protrusion at a first end 17 of the pivot element, which is attached in a corresponding opening provided at the rear end of the first section 3 of the body 2. The pivot element 7 may e.g. be held in place on the body by screws and washers. The pivot element comprises a landing zone 8 that is adapted to interact with a pallet support. The landing zone 8 is an inclined surface ending in a second nose 10. At a second end 18 of the pivot element, a damper element 12 is provided between the body 2 and the pivot element 7. The damper is mounted in a hole in the body 2 and is adapted to damp a downward movement of the pivot element. The damper element is preferably a hydraulic damper provided with oil or air. The damping properties of the damper element 12 can be selected depending on the conveyed load and on the weight of the pallet. The damper element may be adjusted in the brake device or the damper element may be exchanged to a damper element with the required properties.

Figure 2:
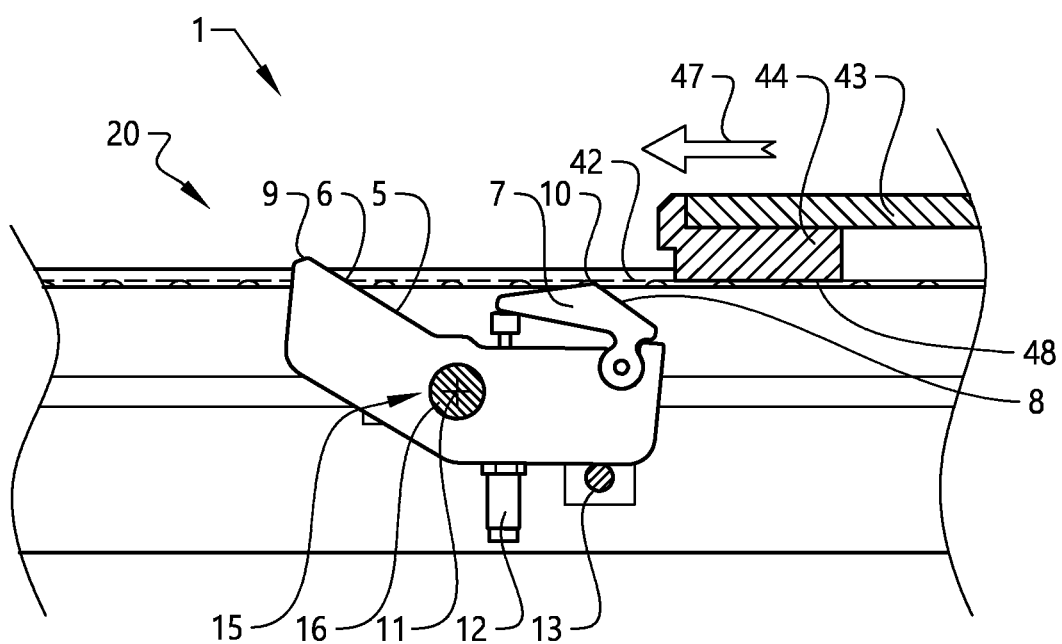
FIG. 2 shows a side view of a brake device according to the invention in a first idle state.

FIG. 2 shows the brake device arranged in a first position 20, in which it is idle. The brake device is preferably designed such that it will hold the first position by itself. The brake device is arranged pivotable on the axle 16 around the rotational axis 11, such that it can pivot to the first position by itself. The weight of the first section of the body of the brake device, the pivot element and the damper is in this example heavier than the second section of the body of the brake device. In this way, the brake device will tilt to the first position, and will rest at a position member 13 that defines the first position. The position member is in this example arranged at the mount 14. It is also possible to use a resilient element such as a coil spring to position the brake device in the first idle position 20. In another example, the body comprises a groove that is concentric with the hole 15 and which defines the amount of rotation for the brake device. A bolt mounted in the clamp ring extends into the groove and allows the brake device to rotate between the two end stops defined by the groove. In the first position, the first nose 9 of the body will extend above the transport plane 42 of the conveyor, and the second nose 10 will be positioned below the transport plane 42. The contact point 6 of the contact surface 5 will be aligned with the transport plane.

When a pallet reaches the brake device, the front edge of the pallet support member will touch the contact point 6 of the contact surface 5. The pallet support will continue forwards such that the front edge will slide against the contact surface, pushing the brake device downwards. When the front edge passes the first nose, the first nose will bear on the lower surface 48 of the pallet support. The first nose 9 will now be aligned with the transport plane. At the same time, the pivot element is raised such that the second nose 10 and part of the landing zone extends above the transport plane. If a first pallet is stopped at a workstation with a stop element, the rear pallet support of the first pallet will bear on the first nose and the brake device will be in the second position 21. The brake device is now adapted to brake a subsequent pallet arriving at the workstation.

If a pallet is not stopped at the workstation, the pallet will continue its movement. The first nose will slide against the lower surface of the pallet support and when the rear pallet support has passed the first nose, the brake device will tilt back to the first position. The distance between the first nose and the second nose should be longer than the length of a pallet support, such that the pivot element will not interfere with the pallet support when the pallet should not stop.

Figure 3:
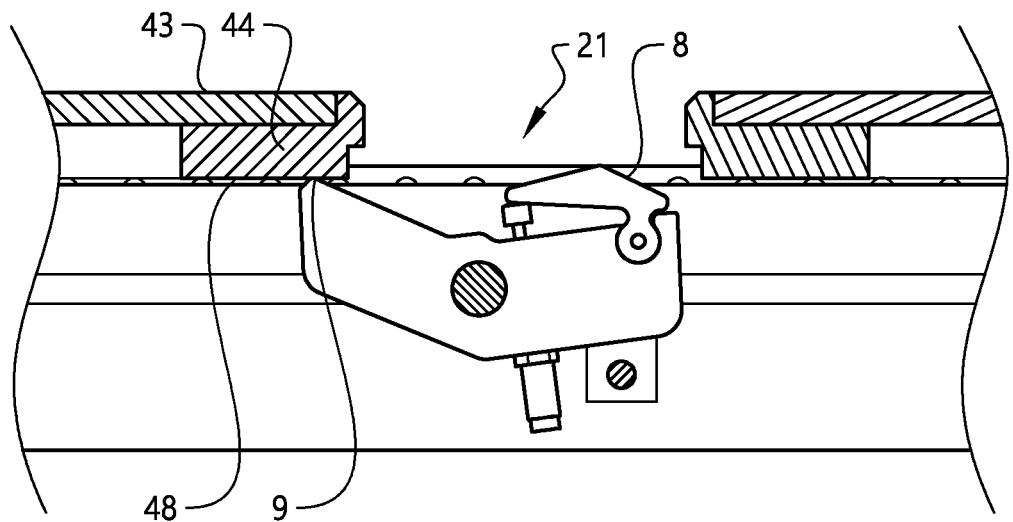
FIG. 3 shows a side view of a brake device according to the invention in a second active state.

FIG. 3 shows the brake device in the second position 21, in which it is adapted to brake a subsequent pallet. The second position is reached when a first pallet bears on the first nose 9. The first pallet is stopped at a stop position by a stop element. In this position, a rear pallet support will rest on the first nose 9, holding it aligned with the transport plane of the conveyor. At the same time, the second nose will extend above the transport plane, and part of the landing zone will extend above the transport plane. In the shown example, the rear part of the pallet support 44 bears on the first nose 9. The first nose 9 may bear on any part of the pallet support. By letting the first nose 9 bear on the front part of the pallet support, the distance between that pallet and the second nose 10 is minimized, which will prevent the subsequent pallet to speed up before it is stopped at the first pallet when the pivot element has been pushed down, i.e. to prevent the pallet from accelerating after the speed has been reduced by the brake device. The speed will in this example remain low when the subsequent pallet arrives at the first pallet.

Figure 4:
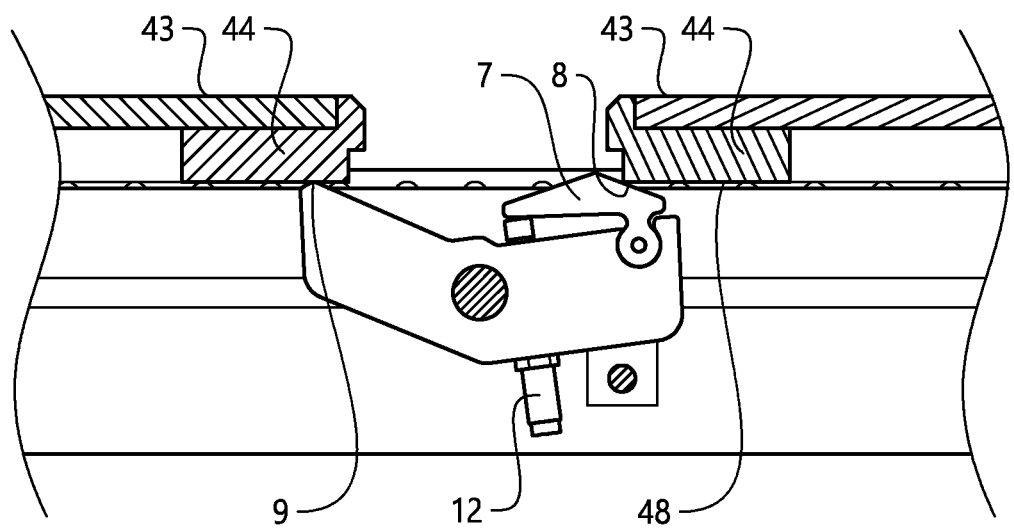
FIG. 4 shows a side view of a brake device according to the invention with a subsequent pallet.
Figure 5:
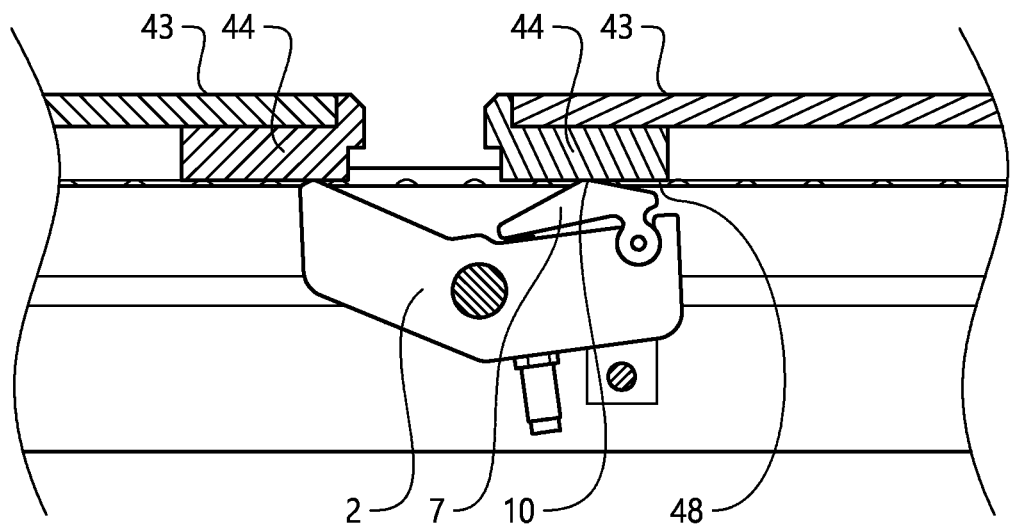
FIG. 5 shows a side view of a brake device according to the invention during a brake action of a subsequent pallet.
Figure 6:
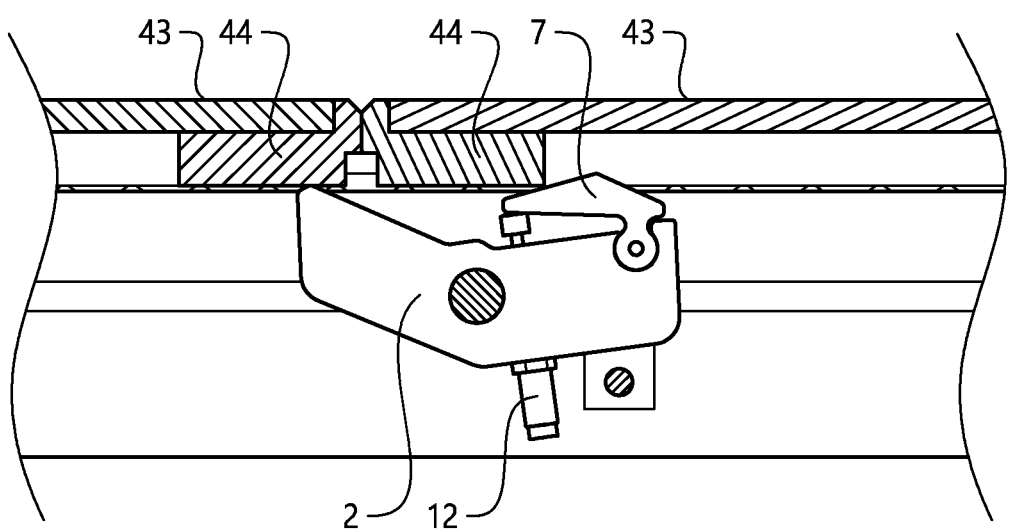
FIG. 6 shows a side view of a brake device according to the invention after a completed brake action.

In FIG. 4, a subsequent pallet is arriving at the workstation. In the shown position, the front edge of the subsequent pallet touches the landing zone 8. This will temporarily stop or slow down the movement of the pallet, depending on several factors. These include the speed of the conveyor, the weight of the pallet and the damping properties of the damper element. If the pallet stops at the landing zone, the forward force of the pallet will push down the pivot element until the second nose is aligned with the transport plane. When the pivot element is pushed down, the pallet can continue the movement forwards, but with a reduced speed, and will abut the first pallet. FIG. 5 shows a damper element which is completely deflated and where a pallet continues the forward travel.

If the pallet is not stopped completely at the landing zone, the pallet will continue forwards with a reduced speed such that the front edge of the pallet support will slide against the landing zone until the lower surface of the pallet support bears on the second nose. The pallet is now raised somewhat and will lose some of the traction from the accumulation chain. The pallet will now push down the pivot element until the second nose is aligned with the transport plane. When the damper is deflated and the pivot element is pushed down completely, the pallet can continue the movement forwards, but with a reduced speed, and will abut the first pallet. This position can be seen in FIG. 6.

FIG. 7 shows a conveyor system 40 comprising stop elements 46 arranged at a workstation. The conveyor system comprises two parallel conveyor beams 41. An accumulation chain is arranged in each conveyor beam. The conveyor system is further provided with a plurality of brake devices 1 positioned along the conveyor beams, and attached at each side of the conveyor. The axle supporting the brake devices is attached to the two conveyor beams. The longitudinal distance between two brake devices corresponds to the length of a pallet 43. In this way, each pallet in a pallet train can be stopped by a brake device. The first pallet is stopped by a stop element comprising a damping function. This stop element is controlled by the control system of the conveyor system. The second pallet is stopped by a first brake device, the third pallet is stopped by a second brake device, etc. In this way, a simple and cost-effective stop function for a pallet queue is obtained.

The invention is not to be regarded as being limited to the embodiments described above, a number of additional variants and modifications being possible within the scope of the subsequent patent claims. The brake device may have any size and may be made from any suitable material.

REFERENCE SIGNS

1: Brake device
2: Body
3: First section
4: Second section
5: Contact surface
6: Contact point
7: Pivot element
8: Landing zone
9: First nose
10: Second nose
11: Rotational axis
12: Damper element
13: Position member
14: Mounting member
15: Hole
16: Axle
17: First end
18: Second end
20: First position
21: Second position
40: Conveyor system
41: Conveyor
42: Transport plane
43: Pallet
44: Pallet support member
45: Accumulation chain
46: Stop element
47: Moving direction
48: Lower surface

The invention claimed is:

1. A brake device for a conveyor system where pallets are conveyed on a transport plane, comprising a body having a first section and a second section, a pivot element having a first end and a second end, where the pivot element comprises an inclined landing zone with a second nose, where the second section comprises an inclined contact surface with a first nose, where the brake device comprises a hole adapted to pivotably suspend the brake device on an axle, wherein the brake device is adapted to hold a first position in which the first nose extends over the transport plane, wherein the brake device is adapted to hold a second position in which the second nose extends over the transport plane, and wherein the first end of the pivot element is pivotably attached to the first section of the body and that the brake device comprises a damper element arranged between the second end of the pivot element and the first section of the body of the brake device.

2. The brake device according to claim 1, wherein the damper element is a hydraulic damper.

3. The brake device according to claim 1, wherein the first end of the pivot element comprises a semi-circular protrusion which is attached to a corresponding opening of the first section of the body.

4. The brake device according to claim 1, wherein the brake device is adapted to reach the second position when a pallet bears on the first nose of the brake device.

5. The brake device according to claim 1, wherein the contact surface is provided with a contact point, and that the distance between the contact point and the second nose is greater than the length of a support member of a pallet that is to be braked.

6. The brake device according to claim 1, wherein the first section of the brake device, the pivot element and the damper element is heavier than the second section of the brake device, and that the brake device is provided with a position member adapted to support the brake device in the first position.

7. The brake device according to claim 1, wherein the brake device is held in the first position by a spring.

8. The brake device according to claim 1, wherein the brake device further comprises an axle having a mounting member adapted to be attached to a conveyor beam.

9. The brake device according to claim 1, wherein the brake device further comprises an axle having two mounting members adapted to attach the brake device to two parallel conveyor beams.

10. A conveyor system adapted to convey pallets on a transport plane, comprising a conveyor and at least one accumulation chain, where the conveyor comprises a stop element adapted to stop a pallet, wherein the conveyor system comprises at least one brake device comprising a body having a first section and a second section, a pivot element having a first end and a second end, where the pivot element comprises an inclined landing zone with a second nose, where the second section comprises an inclined contact surface with a first nose, where the brake device further comprises a hole adapted to pivotably suspend the brake device on an axle, wherein the brake device is adapted to hold a first position in which the first nose extends over the transport plane, wherein the brake device is adapted to hold a second position in which the second nose extends over the transport plane, and wherein the first end of the pivot element is pivotably attached to the first section of the body and that the brake device further comprises a damper element arranged between the second end of the pivot element and the first section of the body of the brake device.

11. The conveyor system according to claim 10, wherein the conveyor system comprises a plurality of brake devices, where a longitudinal distance between two brake devices corresponds to a length of a pallet that is conveyed by the conveyor system.

12. The conveyor system according to claim 10, wherein the conveyor system comprises a plurality of pallets, where a pallet comprises at least one support member, where a length of the support member is shorter than the distance between a contact point of the contact surface of the body and the second nose of the pivot element.

* * * * *